United States Patent [19]

Wu

[11] Patent Number: 4,472,185
[45] Date of Patent: Sep. 18, 1984

[54] METHOD OF PRODUCING A CELLULAR CERAMIC BODY

[75] Inventor: Shy-Hsien Wu, Horseheads, N.Y.

[73] Assignee: Corning Glass Works, Corning, N.Y.

[21] Appl. No.: 461,671

[22] Filed: Jan. 27, 1983

[51] Int. Cl.$^3$ .............................................. C03B 19/10
[52] U.S. Cl. ...................................... 65/21.3; 65/21.4; 65/22; 65/30.13; 65/30.14; 428/404; 428/406; 501/12; 501/33; 501/39; 501/84
[58] Field of Search ........................ 65/21.2, 21.3, 21.4, 65/30.13, 30.14, 22; 501/33, 84, 12, 39; 428/404, 406

[56] References Cited

U.S. PATENT DOCUMENTS

| | | | |
|---|---|---|---|
| 2,883,347 | 4/1959 | Fisher et al. | 65/18.4 X |
| 2,978,339 | 4/1962 | Veatch et al. | 65/21.4 |
| 3,161,468 | 12/1964 | Walsh | 423/335 |
| 3,383,172 | 5/1968 | Biegler et al. | 423/335 |
| 3,790,360 | 2/1974 | Kato et al. | 65/30.13 X |
| 3,957,933 | 5/1976 | Egli et al. | 65/21.2 X |
| 4,101,301 | 7/1978 | Rigbi | 65/21.2 |
| 4,239,519 | 12/1980 | Beall et al. | 65/30.14 X |
| 4,336,338 | 6/1982 | Downs et al. | 65/22 X |
| 4,349,456 | 9/1982 | Sowman | 501/12 X |
| 4,380,569 | 4/1983 | Shaw | 428/406 X |

*Primary Examiner*—Robert Lindsay
*Attorney, Agent, or Firm*—C. S. Janes, Jr.

[57] ABSTRACT

There is disclosed a method of producing a cellular ceramic body of high mechanical strength and exhibiting a density less than 15 lbs/ft$^3$. A crystal-containing gel, prepared from a selected, synthetic, lithium and/or sodium, water-swelling mica, is ion exchanged with a large cation to flocculate the gel and the floc is drained and provided with a gas producing agent. The floc is then molded to desired shape and subjected to gas-producing radiation to cellulate the molded body. The cellulating agent may be retained water, one or more chemical blowing agents, a combustible substance or a vaporizable substance. The floc, in slurry form, may have a thickener added to produce a paste prior to molding. It may also have a plasticizer and/or a binder added as modifiers.

23 Claims, No Drawings

METHOD OF PRODUCING A CELLULAR CERAMIC BODY

BACKGROUND OF THE INVENTION

The invention relates to production of a cellular ceramic body from an ion-exchanged crystalline material which has been separated from a synthetic mica gel in the form of flocculated particles. It is particularly concerned with a cellulating method wherein a gas is evolved within a shaped body to produce cells in the body.

U.S. Pat. No. 4,239,519 (Beall et al.) describes the formation of crystal-containing gels and the fabrication of papers, boards, fibers, films, and coatings from those gels. The process for preparing the gels contemplates three basic steps:

(1) a fully or predominantly crystalline body is formed (commonly a glass-ceramic body) containing crystals consisting essentially of a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite;

(2) the body is contacted with a polar liquid, normally water, to cause swelling and disintegration of the body accompanied with the formation of a gel; and (3) the solid:liquid ratio of the gel is adjusted to a desired level depending upon the product to be prepared therefrom.

The Beall et al. patent further teaches that the gel thus formed may be contacted with a $K^+$, $Rb^+$, $Cs^+$, $NH_4^+$, $H_3O^+$, $Ba^{+2}$, $Pb^{+2}$, $Sr^{+2}$, or $Ca^{+2}$-containing solution which leads to an exchange of $Li^+$ and/or $Na^+$ ions with the larger ions and causes flocculation of the gel. The mechanism underlying flocculation consists of electrically neutralizing the negatively-charged mica or clay particles which have been separated due to hydration and partial loss of interlayer cations into the surrounding solution. The floc settles out such that the supernatant liquid containing the lithium and/or sodium salt can be easily discarded or recovered. The floc may be thoroughly washed and homogenized before being molded to shape.

U.S. Pat. No. 4,239,519 is primarily concerned with use of glass-ceramic type materials to produce crystal-containing gels. However, earlier work, as reported by the Bureau of Mines in Bulletin 647, Fluorine Micas, pages 236-242 (1969), involved sintering and recrystallizing a batch composed of raw materials such as talc, silica, magnesia, and fluorides to produce a water-swelling fluormica that can be used in making paper.

PRIOR LITERATURE

In addition to literature already noted, U.S. Pat. No. 4,239,519 reviews the disclosures of several patents relative to synthetic fluormicas. That review is incorporated herein by reference to avoid repetition.

The use of foaming agents in foaming silica and silicate materials is well known and widely practiced. See, for example, U.S. Pat. No. 2,123,536 (Long) and U.S. Pat. No. 3,174,870 (Connelly et al.).

PURPOSE OF THE INVENTION

A basic purpose of the invention is to provide a method of producing cellular ceramic bodies from known synthetic, water-swelling mica materials.

Another purpose is to provide a method of producing cellular ceramic bodies from floc obtained by flocculating crystal-containing gels, particularly gels produced from synthetic, water-swelling micas.

A further purpose is to provide a method of producing cellular ceramic bodies by forming a shaped body from such floc and evolving a gas to form cells in the body.

A particular purpose is to utilize thermal, gas-producing techniques in the production of cellular ceramic bodies from floc composed of solids separated from a crystal-containing gel of a synthetic, water-swelling mica.

SUMMARY OF THE INVENTION

To these and other purposes, my invention provides a method of preparing a cellular ceramic body of high mechanical strength and exhibiting a density less than 15 lbs./ft.3 which comprises:

(a) forming a crystal-containing gel from a synthetic, lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite, (b) contacting the gel with a source of a large cation to cause an ion exchange between the lithium and/or sodium ions of the mica crystals and the large cation, and to flocculate the ion-exchanged solids content of the gel, (c) draining the floc, (d) providing a gas producing agent dispersed in the floc, (e) molding the floc into a body of desired shape, and (f) subjecting the molded body to gas-producing radiation to simultaneously dry and cellulate the shaped body.

In accordance with one form, the cellulating agent is water retained in the shaped body. In that case, microwave radiation is employed to rapidly evolve steam-filled cells within the body. In another form, one or more chemical blowing agents are incorporated in the floc before molding. The molded body is then heated at a temperature which evolves gas from the agent. The molded body may be heated under load to control cell formation. A further form involves adding particles of material which may volatilize or combust, thus leaving cells. A combination of such cellulating techniques is also possible.

The invention further comprehends mixing floc with a blowing agent and thickener to form a paste which may then be molded and cellulated. Also, a plasticizer, such as ethylene glycol, and/or a binder, such as polyvinyl alcohol, may be included with the gel.

GENERAL DESCRIPTION OF THE INVENTION

A colloidal gel of a synthetic, water-swelling, lithium and/or sodium mica is the base material of the invention. This gel may be prepared by known procedures.

As described in detail in U.S. Pat. No. 4,239,519, a glass of suitable composition to produce the selected mica crystal phase is melted. The glass thus produced is then thermally treated to produce a glass-ceramic material. This is a predominantly crystallized material, in which the crystalline phase is the desired lithium and/or sodium, water-swelling mica. The disclosure of that patent is incorporated herein in total by reference. The crystallized glass is now treated with a polar liquid, normally water, to cause swelling and disintegration of the glass-ceramic into minute particles that disperse in the liquid to form the gel. The crystalline body contains crystals consisting essentially of a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite.

Alternatively, a synthetic, lithium and/or sodium mica gel-forming material e.g., a lithium fluorhectorite, may be produced by sintering a batch composed of suitable raw materials. For example, a batch may be produced from talc, a silica source such as silicic acid or powdered silica, lithium silicate, magnesia, lithia and fluorides of lithium, magnesium, or ammonium. The batch, well homogenized, may be reacted at about 900° C. for 1 to 4 hours to produce a sintered and recrystallized material that contains a lithium fluorhectorite crystal phase. The material produces a gel when it swells and disintegrates in water or other polar liquid. Fusion cast glasses may also be employed if desired.

For purposes of the present invention, a colloidal gel, preferably in water, is formed using either glass-ceramic, fusion cast, or sintered material, as described above. This colloidal gel is adjusted to contain 2.5-25% by weight solids.

The gel formed by dispersing the disintegrated mica is now contacted with a source of a large exchangeable cation. The large cation replaces lithium and/or sodium ions on the mica crystal, thus producing ion-exchanged crystals in the gel. At the same time, the large ion source and the manner of contact causes flocculation of the ion-exchanged crystals. Thus, the crystals aggregate in conglomerate particles which may be separated either by settling or by filtration. The separated wet solids are commonly known as floc.

A wide variety of inorganic and organic cations may be employed for ion exchange. As disclosed in the Beall et al. patent, the inorganic ions include $K^+$, $Rb^+$, $Cs^+$, $NH_4^+$, $H_3O^{30}$, $Ba^{++}$, $Pb^{++}$, $Sr^{++}$, and $Ca^{++}$. Complex organic polycations are disclosed in detail in concurrently-filed application Ser. No. 461,672, now U.S. Pat. No. 4,455,382 granted 6/19/1984 entitled "Organic-Inorganic Composites of Neutralized Polyelectrolyte Complexes".

The large ion is commonly added as a salt which causes flocculation of the ion-exchanged crystals. On the basis of efficient exchange, as well as minimum cost, the potassium ion is customarily selected for exchange, a solution of potassium chloride being a commonly used source. Conveniently, the lithium and/or sodium gel may be jetted in a stream into a KCl bath. The bath may be stirred to provide efficient exchange.

The flocculated crystals that form may settle out by themselves. If not, the gel may be placed in a vacuum filtration system with the floc being retained on a filter. The manner of further treating the floc depends on the cellulating technique selected.

In accordance with one procedure, the floc is molded to desired shape while still wet. This may be accomplished, if desired, by vacuum filtration of the floc in a mold. This technique is particularly effective in board formation.

The partially dry, shaped or molded body is now placed in a microwave oven for a short period of time. This causes water within the molded floc to be converted to steam which causes bloating or foaming of the body. The body is radiated while under load to control the degree and uniformity of foam development within the body.

An alternative procedure involves mixing a gas evolving agent, also known as a chemical blowing agent (CBA), with the drained floc before molding. If the agent is not soluble, it may be mixed in the gel prior to filtration. The important condition is to intimately mix the CBA with the floc. The agent may, for example, amount to 0.5% of the floc content.

The wet cake or board produced by filtering is removed from the filter. Preferably, the cake is then pressed to provide a coherent body. This improves uniformity of cell formation during subsequent treatment.

The molded body is now placed in an oven to simultaneously activate the CBA and dry the body. The oven temperature will be chosen to dissociate or decompose the CBA. Thus, with a typical organic CBA, the temperature may be on the order of 150° C.

As a further variation, combustible or vaporizable materials may be mixed with the floc. As the molded body is heated, these materials, for example, various plastic beads, wood flour, or naphtha, may either oxidize or vaporize. In any case, the action will cause cellulating of the body by development of tiny gas cells. The gas may pass off, but the cells remain. It is also possible to employ more than one material or technique in the cellulating process.

It is, of course, possible to employ an organic polar liquid, rather than water, as a dispersing agent. If a high boiling solvent, such as ethylene glycol (B.P. 197° C), is employed, the board, after drying and cellulating at 150° C, may retain sufficient glycol to exert a plasticizing effect. This provides a tighter cell structure.

Cellulated bodies, as thus far described, are hard, but may still yield slightly under load or pressure. However, this situation may be altered by adding a binder, such as polyvinyl alcohol, to the slurry or gel from which the floc is separated. A cellulated board produced in this manner was rigid, very strong and could not be compressed as previously.

In addition to water soluble binders, such as polyvinyl alcohol, other systems employing organic solvents are possible. Thus, with an organic solvent such as t-butyl alcohol, a silicone varnish might be employed as a binder.

A cellulated board, after firing at an elevated temperature of 850° C., was observed to have a rigid, but thin and easily punctured, surface. Where resistance to puncture is desired, one can form a composite board, that is, a skin/cellulated core/skin-type structure. This may be produced by depositing successive layers of floc in the vacuum filtration process. Thus, a layer of flocculated gel without added CBA is formed on the filter. When this is drained, a second layer of flocculated gel containing a CBA is deposited, followed by a third and final layer without CBA. The composite may then be treated in usual manner. After firing, a thicker, puncture-resistant skin is found on the body.

Instead of starting with a dilute aqueous gel as heretofore described, one may start with a rather concentrated floc in a paste form. This may be made by adding a thickener such as methylcellulose or derivatives of this material. In the thick paste form, the floc may be molded in any desired thickness or shape. It is particularly adapted to extrusion molding.

Where greater strength in the ultimate body is needed, a hydraulic cement, such as disclosed in pending application S.N. 424,030, entitled "Hydraulic Cements Prepared from Glass Powders", may be incorporated in an aqueous paste system prior to molding.

SPECIFIC DESCRIPTION OF THE INVENTION

Example 1

An aqueous gel was prepared by disintegrating in water a water-swelling glass-ceramic containing a lithium fluorhectorite crystal phase. The glass-ceramic was composed of, in parts by weight, 64.4 $SiO_2$, 10.8 MgO, 16.7 $MgF_2$ and 8.0 $Li_2O$. The gel prepared was ion exchanged, and at the same time flocculated, by contacting it with excess potassium chloride solution. This effected an exchange of potassium for lithium ions on the mica crystals, while causing aggregation and separation of the ion exchanged crystals in floc form. The floc was carefully washed to remove residual alkali salts and dried. One hundred grams of an aqueous slurry containing the floc in amount of 10% solids was prepared, and then vacuum filtered to form a wet filter cake about 56 mm. in diameter. The filter cake was dried at 70° C. for 15 minutes, and then removed from the filter. The damp cake was placed under 200 psi pressure for one minute to consolidate any loose areas. It was then placed under a 250 gram weight and introduced into a microwave oven at a simmer setting. After five (5) minutes, the sample was removed and found to have expanded to about twice its original thickness. Greater expansion could occur without the load, but cell size would tend to be quite non-uniform.

Example 2

The procedure just described was followed in detail, except that 0.005 grams of P,P'-oxy bis[benzene sulfonyl hydrazide], a chemical blowing agent (CBA) available from Uniroyal under the name Celogen OT (CEL), was mixed with the flocculated gel prior to filtration. This body, after filtering and pressing, was cellulated in a microwave under the same conditions.

Example 3

Sample boards were prepared as in Example 2 up to the point of removing the damp cake from the filter. Specifically, the cake contained the CBA additive as in Example 2. The damp board was pressed with a force of 200 psi and then placed in a heated oven at 150° C. for 1½ hours. The cake was placed under load of 500 grams during heating to control cell development.

The dried and foamed board thus produced had uniform, tiny foam cells throughout its structure. The thickness was twice as great as before heat treatment. If a greater foaming, at the expense of cell uniformity, is desired, the load might be reduced during heat treatment. For control purposes, a similarly treated body, without the CBA addition, would show a relatively compact, solid structure without any appreciable increase in thickness after the treatment.

Example 4

Example 2 was repeated with the variation that 20 grams ethylene glycol, a high boiling point (197° C.) polar liquid were added to the floc slurry as prepared in Example 2. After firing at 150° C., the dried board was found to be plasticized with the glycol so that a tighter foam cell structure existed.

Example 5

Example 2 was repeated with 0.75 grams of a water-soluble binder, poly-vinyl alcohol, being added to the floc slurry. The final formed board, after firing, was rigid and mechanically strong. It could not be compressed when subjected to a force that easily compressed similar boards wihout the added binder.

Example 6

Preparatory to making a composite board of skin/cellulated core/skin, two slurries or gels were prepared. The first contained no CBA as in Example 1. The second differed in that a CBA addition was made as in Examples 2 and 3. A vacuum filtration system was set up and 75 grams of the first gel was poured into the filtering funnel. When this was adequately drained, 50 grams of the second gel was added. Following drainage, another 75 grams of the first gel was added.

The composite wet board thus formed was under load of 200 psi for two minutes, and then dried and cellulated in a heated oven at 150° C. for 5 hours while under a 300 gram load. The resulting composite was observed to have a distinct, relatively thick skin on each side of a uniformly cellulated core. The thickness of the composite increased from 6.5 mm to 9.5 mm during the 150° C. heat treatment.

The composite was fired at 850° C. The composite, like the single boards heretofore described, was rigid and strong. Unlike the earlier boards, it could not be punctured as could the others.

Example 7

Four (4) grams of hydroxy propyl methylcellulose were dissolved in 40 grams formamide at room temperature. Eight (8) grams of the organic CBA used in Example 2 was dispersed in the same amount of dimethyl formamide. This dispersion and 40 grams of a potassium-ion-exchanged floc of lithium fluorhectorite crystals were successively added to the cellulose solution. The viscous mass was thoroughly mixed by several extrusions through a die with small channels. The homogeneous paste (40% floc) thus produced was then stored under refrigeration preliminary to foaming.

Twenty grams of the paste just described were placed in a 1 ½" die and subjected to 2500 psi for five (5) minutes to form a disk 9/16"in height. This disc was then subjected to a progressive heating schedule wherein the body was held at 120° C., 150° C. and 900° C. for one hour each. The resulting body was about one inch in height by 1 1/2" in diameter, was off-white, and had elongated tiny cells throughout.

Examples 8–9

Formamide was replaced as a solvent for hydroxy propyl methylcellulose in Example 7 by, respectively, 20 grams each of formamide and dimethyl formamide, and by 40 grams of dimethylformamide. The latter required dissolution at 120° C. The resulting pastes were more viscous, but otherwise were molded and fired with similar results.

Example 10

0.6 gram methylcellulose was dissolved in 13.4 grams distilled water at room temperature. Six (6) grams of floc, prepared as in Example 1, were then added to yield a soft paste. Several such mixtures were prepared and a different foaming material added to each. In the TABLE A below, the examples are referenced to the cellulating materials characteristic of each. The cellulating materials were polystyrene (PST) beads about 50 mesh size, acrylic (ACL) beads about 200 mesh size, and the organic blowing agent of Example 2 (CEL), the latter being dissolved in dimethylformamide (2.7 grams in 2 grams DMF).

TABLE A

| Example No. | Agent |
|---|---|
| 10 | 30 grams PST |
| 11 | 60 grams PST |
| 12 | 30 grams ACL |
| 13 | 10 grams PST |
|    | 20 grams ACL |
| 14 | 20 grams PST |
|    | 10 grams ACL |
| 15 | 20 grams PST |
|    | 40 grams ACL |
| 16 | 30 grams PST |
|    | 2.7 grams CEL |

In each case, a glass hydraulic cement was added to the soft paste in amount of about 10% by weight of the floc. The glass was composed of: 72.3 $SiO_2$, 22.8 $K_2O$, $P_2O_5$ and 2.5 $Al_2O_3$. This addition served to hold the structure intact during subsequent firing when the beads were melted and burned off.

Twenty grams of each mix were placed in a 1 ¾" diameter mold and the resulting disk, about ½" in height, was subjected to a firing schedule of one hour each at 150° C., 200° C., 300° C., 400° C., 500° C. and 900° C. The fired bodies were white, fairly strong, and had tiny circular cells distributed throughout.

In TABLE B below, the density in lbs./ft.$^3$ of each fired body is shown:

TABLE B

| Example No. | Density (lbs/ft$^3$) |
|---|---|
| 10 | 7.4 |
| 11 | 4.3 |
| 12 | 8.0 |
| 13 | 7.2 |
| 14 | 8.7 |
| 15 | 5.0 |
| 16 | 4.8 |

In all cases the fired bodies were found to resist moisture pickup, the pickup being only 1.5% by weight after one week at 75% R.H. No appreciable loss of strength was noted.

Example 17

A paste was prepared by adding two (2) grams methylcellulose to 22 grams water. To this was added a chemical blowing agent solution in which three (3) grams of the organic blowing agent CEL were dissolved in three (3) grams dimethylformamide. Twenty grams of floc, prepared as described earlier, were then added with intimate mixing. The resulting mix had good cohesive strength and was refrigerated prior to molding. The paste was later molded and fired in accordance with the procedure set forth in Examples 10–16.

Example 18

The procedure of Example 17 was repeated with the following ingredients and proportions employed:
1.5 grams methylcellulose in 29 grams water
2.3 grams CEL in 2.2 grams dimethylformamide
15 grams floc.

The resulting paste was softer than that of Example 17 and sticky to handle. However, it gave a lower fired density of about 10 lbs/ft$^3$.

I claim:

1. A method of preparing a cellular ceramic body of high mechanical strength and exhibiting a density of less than 15 lbs/ft$^3$ which comprises,
    (a) forming a crystal-containing gel from a synthetic, lithium and/or sodium, water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite,
    (b) contacting the gel with a source of a large cation to cause an ion exchange between the lithium and/or sodium ions of the mica crystals and the large cations, and to flocculate the ion-exchanged solids content of the gel,
    (c) draining the floc,
    (d) providing a gas-producing agent dispersed in the floc,
    (e) molding the floc into a body of desired shape, and
    (f) subjecting the molded body to gas-producing radiation to simultaneously dry the shaped body and generate gas from the gas-producing agent.

2. A method in accordance with claim 1 wherein the gel contains lithium fluorhectorite crystals.

3. A method in accordance with claim 1 wherein the gel is contacted with a source of exchangeable potassium ions.

4. A method in accordance with claim 1 wherein the floc is drained by filtration and a damp filter cake is formed.

5. A method in accordance with claim 1 wherein the gasproducing agent is water retained in the drained floc, and the molded floc is subjected to microwave radiation to convert the water to steam.

6. A method in accordance with claim 1 wherein the gasproducing agent is at least one chemical blowing agent that decomposes rapidly under thermal treatment and the body is heated at least to the decomposition temperature for the agent.

7. A method in accordance with claim 1 wherein the gasproducing agent is a combustible material and the body is heated at least to the combustion temperature.

8. A method in accordance with claim 1 wherein the foaming agent is a vaporizable material and the body is heated to at least the vaporization temperature.

9. A method in accordance with claim 1 wherein the damp floc is compressed to a body of desired shape and that body is heated under load to cause controlled foam cell development.

10. A method in accordance with claim 1 wherein the floc is mixed with a thickener to form a paste that is molded to desired shape and heated to an elevated temperature to cellulate the body.

11. A method in accordance with claim 10 wherein the thickener is methyl cellulose or a derivative thereof.

12. A method in accordance with claim 10 wherein the thickener is dissolved in an aqueous solvent.

13. A method in accordance with claim 10 wherein the thickener is dissolved in an organic solvent.

14. A method in accordance with claim 13 wherein the organic solvent is formamide or a derivative thereof.

15. A method in accordance with claim 1 wherein the waterswelling mica disintegrates and is dispersed in an organic polar liquid to form a gel.

16. A method in accordance with claim 1 wherein a binder is added to the floc.

17. A method in accordance with claim 16 wherein the binder is polyvinyl alcohol.

18. A method in accordance with claim 1 wherein a plasticizer is added to the floc.

19. A method in accordance with claim 18 wherein the plasticizer is ethylene glycol.

20. A method according to claim 1 wherein two distinct ionexchanged flocs are provided, one containing an added gasproducing agent and the other being without such addition, and three coincident layers of floc are formed in a drainage device, the first and third layers being formed with the floc free from a gas-producing agent, and the second layer being formed from the floc containing a gas-producing agent.

21. A method according to claim 10 wherein a hydraulic cement glass is incorporated in the floc prior to molding and firing.

22. A method in accordance with claim 21 wherein the cement glass addition, based on the floc, does not exceed 20%.

23. A method in accordance with claim 22 wherein the cement glass addition does not exceed 10% of the floc.

* * * * *